United States Patent
Yang et al.

(10) Patent No.: US 7,443,448 B2
(45) Date of Patent: Oct. 28, 2008

(54) APPARATUS TO SUPPRESS ARTIFACTS OF AN IMAGE SIGNAL AND METHOD THEREOF

(75) Inventors: Seung-joon Yang, Seoul (KR); Young-jin Kwon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 544 days.

(21) Appl. No.: 10/964,712

(22) Filed: Oct. 15, 2004

(65) Prior Publication Data

US 2005/0219408 A1    Oct. 6, 2005

(30) Foreign Application Priority Data

Oct. 18, 2003   (KR) ..................... 10-2003-0072779

(51) Int. Cl.
   *H04N 5/21*   (2006.01)
   *H04N 7/01*   (2006.01)
(52) U.S. Cl. ................. 348/441; 348/607; 348/448
(58) Field of Classification Search ........... 348/607, 348/441, 533, 535, 616, 617, 619–620, 622; *H04N 5/21, H04N 7/01*
   See application file for complete search history.

(56) References Cited

U.S. PATENT DOCUMENTS

| | | | | |
|---|---|---|---|---|
| 5,068,914 A | * | 11/1991 | Klees | .......... 382/275 |
| 5,387,987 A | * | 2/1995 | Ino | .......... 358/3.03 |
| 5,515,456 A | * | 5/1996 | Ballard | .......... 385/252 |
| 6,118,905 A | * | 9/2000 | Uehara et al. | .......... 382/252 |
| 6,297,847 B1 | | 10/2001 | Fisch | |
| 6,489,998 B1 | | 12/2002 | Thompson et al. | |

FOREIGN PATENT DOCUMENTS

| | | |
|---|---|---|
| JP | 2001-320679 | 11/2001 |
| KR | 20010115 | 6/1999 |

\* cited by examiner

*Primary Examiner*—Trang U Tran
(74) *Attorney, Agent, or Firm*—Stanzione & Kim, LLP

(57) ABSTRACT

An apparatus to suppress artifacts in an image signal. The apparatus includes a differential value calculation unit to calculate a differential value between adjacent pixels with respect to an input image signal, a diffusion amount calculation unit to calculate an amount of diffusion between the adjacent pixels on the basis of the differential value calculated by the differential value calculation unit, and a pixel value conversion unit to convert the present pixel value of the image signal inputted on the basis of the diffusion amount between the pixels calculated by the diffusion amount calculation unit. The apparatus changes the pixel value in consideration of the differential value between the adjacent pixels, and thus it can provide a high quality image signal without losing or misrecognizing the artifacts of the image signal.

21 Claims, 5 Drawing Sheets

APPARATUS TO SUPPRESS ARTIFACTS OF AN IMAGE SIGNAL AND METHOD THEREOF

CROSS-REFERENCE TO RELATED APPLICATIONS

This application claims the benefit of Korean Patent Application No. 2003-72779 filed Oct. 18, 2003, in the Korean Intellectual Property Office, the disclosure of which is incorporated herein by reference.

BACKGROUND OF THE INVENTION

1. Field of the Invention

The present general inventive concept relates to an apparatus and method of suppressing artifacts of an image signal and a method thereof, and more particularly to an apparatus to suppress artifacts generated in an image signal and a method thereof.

2. Description of the Related Art

Human eyes perceive a continuous image in a moving picture when viewing 16 or more frames per second. In a moving picture, 16 frames per second correspond to a minimum sampling frequency (i.e., Nyquist frequency) for sampling a signal with the signal's information preserved. In consideration of this, a movie image is processed at a speed of 24 frames per second, and a TV image is processed at a speed of 25 to 30 frames per second.

Movies typically use a progressive system that instantaneously stores every picture in a film and progressively projects the pictures onto a screen. With television, since an image is basically transmitted over the air, each picture is filmed and transmitted through scanning of several hundreds of scanning lines, and then is displayed on a screen of a Braun tube by the scanning. In the NTSC (National Television System Committee) color TV system adopted in the United States, Japan, Korea, etc., 30 frames, each of which is composed of 525 scanning lines per second, are transmitted. In the PAL (Phase Alternation by Line) system or SECAM (Sequential Couleur a Memoire) system, 25 frames, each of which is composed of 625 scanning lines per second are transmitted.

Generally, TV uses an interlaced scanning method that divides one picture (i.e., frame) into two fields and alternately scans the two fields in order to effectively present a moving image using limited scanning lines. The divided fields are called top and bottom fields, odd and even fields, upper and lower fields, etc. Accordingly, the NTSC system processes 60 frames per second, and the PAL or SECAM system processes 50 frames per second.

When a movie is televised through a TV, every frame of the movie is transmitted through a converter called a telecine (which is a compound word of a television and a cinema). Currently, if the movie is reproduced through the TV without matching the number of pictures with that of TV, the movie is displayed on the TV screen at a higher frame rate than a normal frame rate. In the case of transmitting the movie through the NTSC TV system, 60 fields should be obtained from 24 pictures (i.e., frames) per second. Thus, two fields should be obtained from 2 pictures, in order to match the picture speed. A simple and widely used method is called a "3:2 pull-down" system, which scans three fields with respect to one picture, and scans two fields with respect to the other picture.

In principle, a DVD (Digital Video Disc) can provide an image of 24 frames in the same manner as the original movie. However, since most display appliances, such as TVs, adopt the interlaced scanning system, the DVD is actually made to adopt the interlaced scanning system. However, a personal computer or a digital TV adopts the progressive scanning system, and thus a de-interlacing operation, which is the reverse of the 3:2 pull-down operation, should be performed to restore the image frames of the interlaced scanning system to the progressive scanning system.

Three de-interlacing methods for converting the image signal of the interlaced scanning system into the image signal of the progressive scanning system have been used.

A first method of de-interlacing is to remove one of the two fields. This method provides a frame by removing one field and blending or interpolating the other field. This method has the drawbacks in that the resolution of the image deteriorates by half and a specified image at a specified time point may disappear due to the removal of one field.

A second method of de-interlacing is called a blending or weaving method. This method provides a field by combining a top field and a bottom field. According to this method, one frame is provided by simply inserting a line of the previous field between lines of the present field. In the case of interpolating a still image, this method can be easily implemented. However, in the case of interpolating a moving image, horizontal lines may appear on a displayed picture or the displayed picture may deteriorate. That is, when there is no temporal gap between the fields of the same frame of a telecine image, this method can provide a perfect progressive image through proper processing of the image. However, since there is a temporal gap of about 1/60 of a second between the fields of the different frames, image inconsistency exists between the fields of the images in motion, and this causes the picture quality to deteriorate when the image is blended.

A Third method of de-interlacing is called a BOB or line doubling method. This method provides a frame by using the respective lines of a field twice. In other words, a new frame is provided by inserting average data of two lines into an area between the two lines in a field. This inter-field interpolating method prevents the horizontal lines from occurring in a displayed image in motion. However, in the case of interpolating a still image, the displayed picture deteriorates, and a complicated and minute picture flickers with 30 Hz.

As described above, some de-interlaced artifacts may be generated in the de-interlaced image signal, and such de-interlaced artifacts become greater as the picture frames are switched or the image moves fast. Accordingly, a post-process for suppressing the de-interlaced artifacts and obtaining an image of a high picture quality is required.

FIG. 1 is a block diagram schematically illustrating a conventional apparatus for suppressing de-interlaced artifacts. Referring to FIG. 1, the de-interlaced artifact suppressing apparatus includes a converter 10, a sawtooth artifact detector 20 and a vertical averager 30.

The converter 10 converts an image signal of an interlaced scanning system into an image signal of a progressive scanning system. The conversion of the image signal of the interlaced scanning system into the image signal of the progressive scanning system is performed using any one of the three methods as described above. Also, other conversion methods can be used as well.

The sawtooth artifact detector 20 determines an area in which sawtooth artifacts are produced if the area has a greater pixel difference value than a threshold value between two adjacent horizontal scanning lines of the de-interlaced image signal, and has a smaller pixel difference value than the threshold value between two scanning lines skipping over one scanning line. Here, the sawtooth artifact is a phenomenon where a difference between a scanning line, which is interpolated through a de-interlacing process and located between two adjacent horizontal scanning lines of the interlaced image signal having similar properties, and the scanning line of the interlaced image signal.

The condition that a pattern of sawtooth artifacts is detected through the sawtooth artifact detector 20 is in equation 1 and equation 2 as follows:

if |line $n$–line $(n+2)$|≅0 and |line $n$–line $(n+1)$|< >0    Equation 1 or if |line $n$–line $(n-1)$|≅|line $n$–line $(n+1)$|< >0    Equation 2

That is, the sawtooth artifact detector 20 decides that the pattern of the interpolated scanning lines is the pattern of the sawtooth artifacts if the area has a greater pixel difference value than a threshold value between two adjacent horizontal scanning lines of the de-interlaced image signal and has a smaller pixel difference value than the threshold value between two scanning lines skipping over one scanning line, or if the difference between the interpolated scanning line and the adjacent horizontal scanning lines is greater than the threshold value.

The vertical averager 30 removes the sawtooth artifacts by filtering the area determined to be the sawtooth artifact area in a vertical direction. At this time, a 5-pole vertical-direction filter is used in order to remove the sawtooth artifacts. The 5-pole vertical-direction filter has a rise time suitable in a pre-shoot or an over-shoot, is low-priced, and has a low complexity.

FIG. 2 is a view illustrating an image signal in which sawtooth artifacts are suppressed by the sawtooth artifact suppressing apparatus of FIG. 1. In FIG. 2, a horizontal axis represents positions of scanning lines in a vertical direction, and a vertical axis represents pixel values according to the positions of the scanning lines in the vertical direction. Also, the solid line represents an image signal before the sawtooth artifacts are suppressed, and the dotted line represents an image signal after the sawtooth artifacts are suppressed.

However, the conventional sawtooth artifact suppressing apparatus, which detects an area in which the sawtooth artifacts are generated by comparing the difference between the scanning lines with a threshold value, has the drawbacks in that the generated sawtooth artifacts may be lost due to the set threshold value. Another drawback is that an area in which no sawtooth artifacts are generated may be misrecognized as the sawtooth artifact area.

Also, in the case of an image with a heavy motion, the de-interlaced artifacts become distorted, and this causes the sawtooth artifacts to also be distorted. In this case, no efficient suppression of the sawtooth artifacts can be obtained through just the vertical filtering of the image signal.

SUMMARY OF THE INVENTION

An aspect of the present general inventive concept is to solve at least the above-identified problems and/or disadvantages and to provide at least the advantages described hereinafter.

Another aspect of the present general inventive concept is to provide an apparatus to suppress artifacts of an image signal and a method thereof that can provide an image signal of a high picture quality by suppressing the artifacts generated in the image signal.

Additional aspects and advantages of the present inventive concept will be set forth in part in the description which follows and, in part, will be obvious from the description, or may be learned by practice of the invention.

To achieve the above and/or other aspects and features of the present general inventive concept, there is provided an apparatus to suppress artifacts of an image signal that includes: a differential value calculation unit calculating a differential value between a present pixel value and an adjacent pixel value with respect to an input image signal; a diffusion amount calculation unit calculating a diffusion amount between adjacent pixels based on the differential value calculated by the differential value calculation unit; and a pixel value conversion unit converting the present pixel value of the input image signal on the basis of the diffusion amount between the pixels calculated by the diffusion amount calculation unit.

In an aspect of the general inventive concept, the artifact suppressing apparatus may further include a counting unit to count the number of processes of converting the present pixel value with respect to the input image signal. If the value counted by the counting unit is smaller than a preset value, the differential value calculation unit sets the present pixel value to the converted pixel value and calculates the differential value between the present pixel and an adjacent pixel. Also, the differential value calculated by the differential value calculation unit is a difference between the present pixel value and the adjacent pixel value in a respective direction.

In another aspect of the general inventive concept, the diffusion amount calculation unit calculates the amount of diffusion by the following equation:

$$D = c \cdot \Delta I$$

wherein, c denotes a conduction coefficient and $c \equiv 1/[1+ \{|\Delta I|/K\}^2]$, D denotes an amount of diffusion, $\Delta I$ denotes a differential value between the present pixel value I and a neighboring pixel value $I_N$, and K denotes a differential value whereby the conduction coefficient becomes 0.5.

The pixel value conversion unit converts may convert the present pixel value using the following equation:

$$I_{t+1} = I_t + \lambda \Sigma c \cdot \Delta I$$

where, $I_t$ denotes a converted pixel value in the case that the number of repetition is t, and $\lambda$ denotes a constant that determines the effect of the whole diffusion.

In another aspect of the general inventive concept, the artifact suppressing apparatus may further include a scanning line decision unit to decide whether the scanning line of the input image signal is the scanning line interpolated through a de-interlacing process. Here it is an aspect that if it is decided that the scanning line of the input image signal is the interpolated scanning line by the scanning line decision unit, the differential value calculation unit calculates the differential value.

In yet another aspect of the present general inventive concept, there is provided a method to suppress artifacts that may include the operations of calculating a differential value between adjacent pixels with respect to an input image signal, calculating an amount of diffusion between the adjacent pixels on the basis of the differential value calculated at the operation of calculating a differential value, and converting the present pixel value of the image signal inputted on the basis of the diffusion amount between the pixels calculated at the calculating an amount of diffusion operation.

The artifact suppressing method may further include the operation of counting the number of processes of converting the present pixel value with respect to the input image signal. Here, if the value counted at the calculating a differential value operation is smaller than a preset value, then the operation of calculating a differential value sets the present pixel value to the converted pixel value and calculates the differential value between the present pixel and an adjacent pixel. Also, the differential value calculated by the calculating a differential value operation is a difference between the present pixel value and the adjacent pixel value in a respective direction.

The operation of calculating an amount of diffusion may calculate the amount of diffusion by the following equation:

$$D = c \cdot \Delta I$$

where, c denotes a conduction coefficient and $c \equiv 1/[1+\{|\Delta I|/K\}2]$, D denotes an amount of diffusion, $\Delta I$ denotes a differential value between the present pixel value I and a neighboring pixel value $I_n$, and K denotes a differential value whereby the conduction coefficient becomes 0.5.

The converting operation may convert the present pixel value by the following equation:

$$I_{t+1} = I_t + \lambda \Sigma c \cdot \Delta I$$

where $I_t$ denotes a converted pixel value in the case that the number of repetition is t, and $\lambda$ denotes a constant that determines the effect of the entire diffusion.

The artifact suppressing method may further include an operation of deciding whether the scanning line of the input image signal is the scanning line interpolated through a de-interlacing process. Here, it is an aspect that if it is decided that the scanning line of the input image signal is the interpolated scanning line at the deciding operation, the operation of calculating a differential value calculates the differential value.

Accordingly, the artifact suppressing apparatus according to the present invention can simply and efficiently suppress artifacts generated in the input image signal as well as artifacts generated in the interpolated image signal.

The above and/or other aspects and features can also be achieved by a system that includes: a diffusion calculation unit calculating a diffusion amount between a present pixel value and an adjacent pixel value based on a degree of movement; and an artifact suppressor suppressing artifacts by converting the present pixel value into a converted pixel value while compensating for the movement using the diffusion amount.

The above and/or other aspects and features can also be achieved by a method that includes: calculating a differential value between a present pixel value and an adjacent pixel value with respect to an input image signal; computing an amount of diffusion between the present pixel value and the adjacent pixel value based on the differential value calculated by the calculating; and converting the present pixel value of the input image signal into a proper pixel value based on the diffusion amount between the pixels calculated by the computing.

The above and/or other aspects and features can also be achieved by a method that includes: calculating a diffusion amount between a present pixel value and an adjacent pixel value; and an artifact suppressor suppressing artifacts by converting the present pixel value into a converted pixel value while compensating for the movement using the diffusion amount.

BRIEF DESCRIPTION OF THE DRAWINGS

The above aspects and other advantages of the present inventive concept will become more apparent by describing in detail the preferred embodiments thereof with reference to the attached drawings in which.

DETAILED DESCRIPTION OF THE PREFERRED EMBODIMENTS

Figure 1:
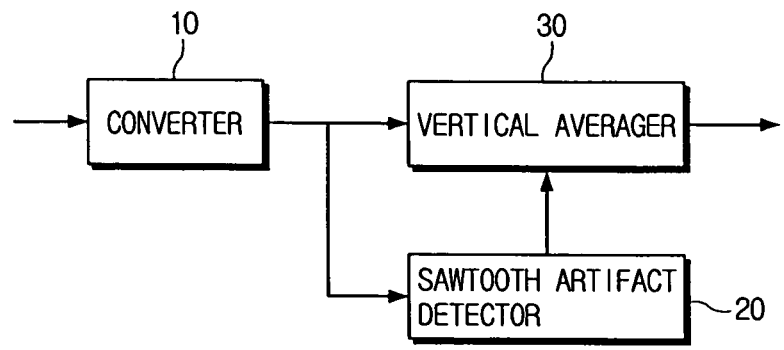
FIG. 1 is a block diagram schematically illustrating a conventional apparatus for suppressing de-interlaced artifacts.
Figure 2:
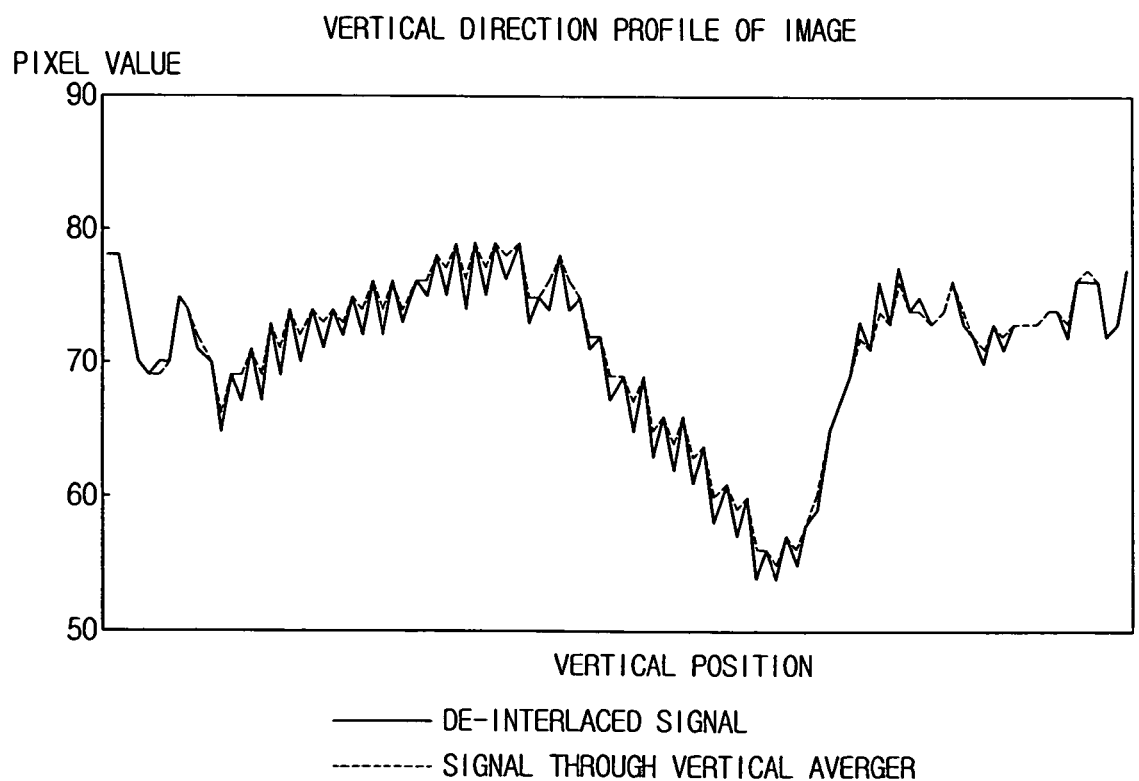
FIG. 2 is a view illustrating an image signal in which sawtooth artifacts are suppressed by a sawtooth artifact suppressing apparatus of FIG. 1.

An apparatus to suppress artifacts of an image signal and a method thereof according to a preferred embodiment of the present general inventive concept will be described in detail with reference to the annexed drawings in which like reference numerals refer to like elements.

Figure 3:
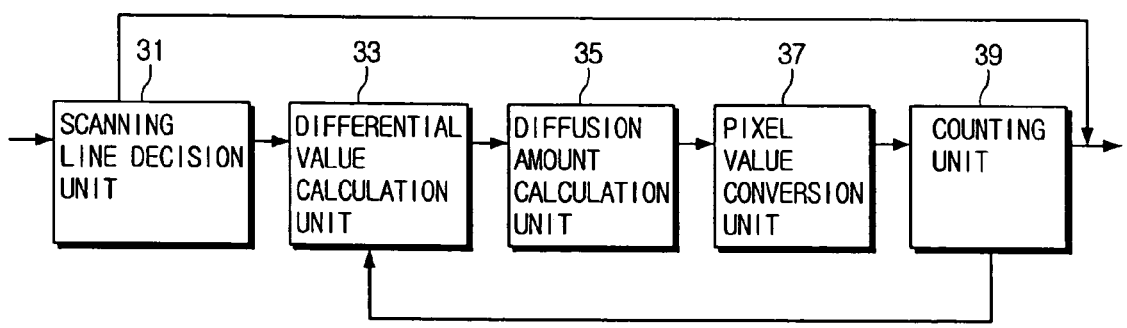
FIG. 3 is a block diagram schematically illustrating an artifact suppressing apparatus according to the general inventive concept.

FIG. 3 is a block diagram schematically illustrating an artifact suppressing apparatus according to an embodiment of the general inventive concept. Referring to FIG. 3, the artifact suppressing apparatus can include a scanning line decision unit 31, a differential value calculation unit 33, a diffusion amount calculation unit 35, a pixel value conversion unit 37 and a counting unit 39.

The scanning line decision unit 31 can decide whether a scanning line of an input image signal is a scanning line interpolated through a de-interlacing process. The scanning line decision unit 31 is an element necessary to suppress de-interlaced artifacts generated during a process of converting an interlaced type image signal into a progressive type image signal. It is an aspect to remove the scanning line decision unit 31 when other artifacts generated in the image signal are suppressed as well as when the de-interlaced artifacts are considered.

The differential value calculation unit 33 can calculate a differential value between the present pixel and the adjacent pixel with respect to an input image signal. Also, in the case of suppressing the artifacts generated during the de-interlacing process, the differential value calculation unit 33 calculates the differential value between the present pixel and the adjacent pixel if the scanning line decision unit 31 decides that the scanning line of the image signal is the interpolated scanning line. The differential value $\Delta I$ calculated by the differential value calculation unit 33 is defined as the difference between the pixel value of the present pixel and the pixel value of the adjacent pixel in a respective direction. This can be expressed by the following equation 3:

$$\Delta I = IN - I \qquad \text{Equation 3}$$

wherein I denotes the pixel value of the present pixel, and IN denotes the pixel value of the pixel adjacent to the present pixel.

Figure 4:
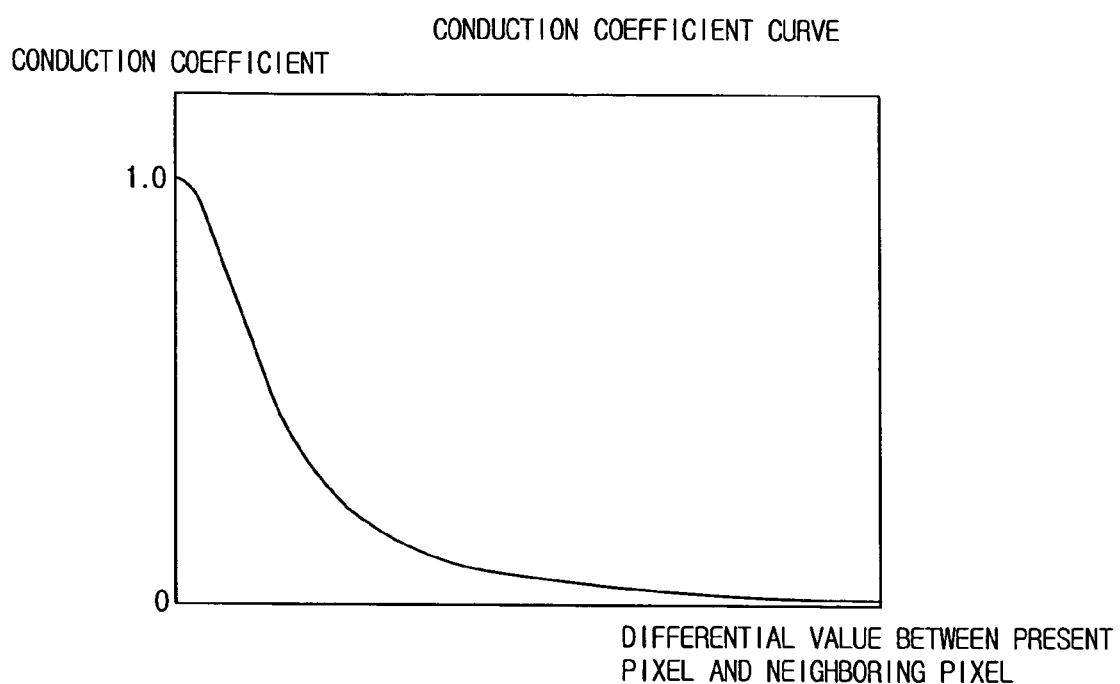
FIG. 4 is a view illustrating the change of the conduction coefficient according to increase/decrease of a differential value.

The diffusion amount calculation unit 35 can calculate the amount of diffusion between the present pixel and the adjacent pixel on the basis of the differential value calculated by the differential value calculation unit 33. At this time, the amount of diffusion calculated by the diffusion amount calculation unit 35 can be expressed by the following equation 4:

$$D = c \cdot \Delta I \qquad \text{Equation 4}$$

wherein D denotes the amount of diffusion and c denotes a conduction coefficient. The conduction coefficient c is calculated as follows:

$$c = 1/[1 + \{|\Delta I|/K\}2] \qquad \text{Equation 5}$$

wherein K denotes a differential value when the conduction coefficient becomes 0.5. As this value becomes greater, the curve of the conduction coefficient descends gently. The change of the conduction coefficient according to the change of the differential value is shown in FIG. 4. Referring to FIG. 4, K is calculated when the conduction coefficient between the present pixel and the neighboring pixel becomes 0.5, and the differential value is changed according to the calculated value K. As a result, the curve of the conduction coefficient becomes smoother as the differential value becomes greater. According to this characteristic, the diffusion amount calculation unit 35 computes that a large amount of diffusion exists between similar pixels, which corresponds to a small differential value with respect to the present pixel. The diffusion amount calculation unit 35 may calculate a small amount of diffusion between different pixels, which corresponds to a large differential value with respect to the present pixel.

The pixel value conversion unit 37 can convert the pixel value of the present pixel of the input image signal on the basis of the amount of diffusion between the present pixel and the adjacent pixel calculated by the diffusion amount calculation unit 35. That is, the pixel value conversion unit 37 can suppress the artifacts of the image signal being displayed by converting the pixel of the input image signal into a proper pixel value according to the differential value between the present pixel and the adjacent pixel. At this time, by applying a proper amount of diffusion according to the degree of the differential value, i.e., according to the degree of movement of the input image signal, the pixel value conversion unit 37 can properly compensate for the pixel value of the present pixel.

When the pixel value of the present pixel of the input image is changed, the counting unit 39 counts the number of processes of converting the present pixel value, for example, the number of processes from the calculation of the differential value between the present pixel and the adjacent pixel to the conversion of the pixel value of the present pixel (hereinafter referred to as "the number of repetitions."

The pixel value of the present pixel converted by the pixel value conversion unit 37 can be expressed by the following equation 6:

$$I_{t+1} = I_t + \lambda \Sigma c \cdot \Delta I \qquad \text{Equation 6}$$

wherein It denotes the converted pixel value when the number of repetitions is t, and λ denotes a constant that determines the effect of the whole diffusion. Thus, the diffusion is stably performed when λ is set below 0.25.

The number of repetitions t counted by the counting unit 39 is compared with a preset value. If the number of repetitions t is smaller than the preset value, the differential value calculation unit 33 sets the present pixel value to the converted pixel value and calculates the differential value between the present pixel and the adjacent pixel. This process is repeated until the number of repetition t becomes higher than the preset value, and if the number of repetitions t becomes higher than the preset value, the converted pixel value is set as a resultant pixel value, and the artifact suppressing process is terminated. At this time, the resultant pixel value will be the pixel value of the pixel displayed on a display (not illustrated). If the number of repetitions is 1, the present pixel is affected by the neighboring pixel, but as the number of repetitions becomes larger, the range of the affecting pixels is increased. Accordingly, by repeating an anisotropic diffusion process, the pixel value of the present pixel can be compensated for in consideration of the characteristics of a wide area of the image signal, not of a part of the image signal. Also, by properly setting the preset value to be compared with the number of repetitions t, an endless repetition is prevented, and only a proper area of the image signal can be considered. Accordingly, the display can display the image with the artifacts generated in the image signal suppressed.

Figure 5:
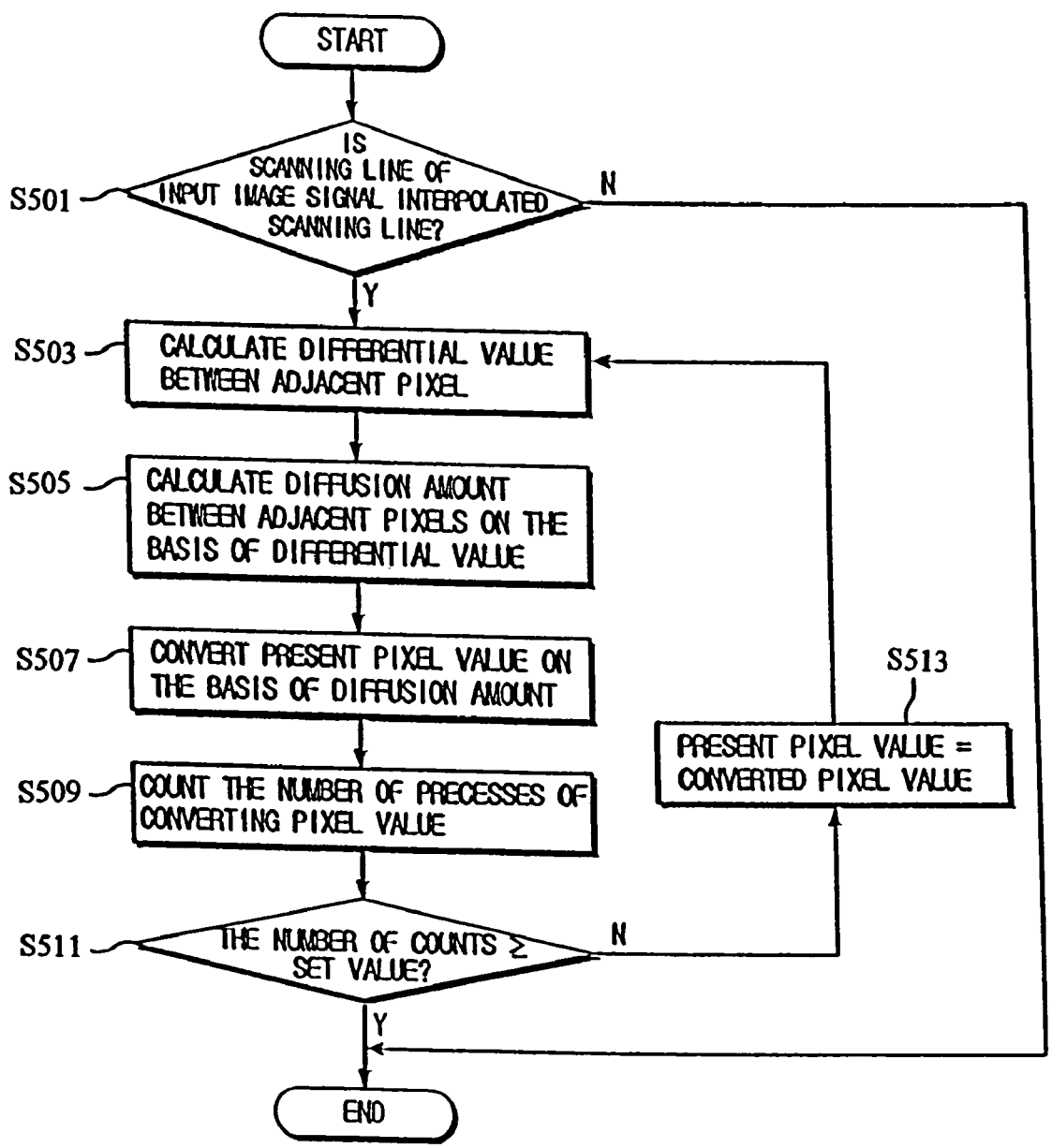
FIG. 5 is a flowchart illustrating an artifact suppressing method according to the general inventive concept.

FIG. 5 is a flowchart illustrating an artifact suppressing method according to an embodiment of the general inventive concept. Referring to FIG. 5, the artifact suppressing method according to this embodiment will now be described.

The scanning line decision unit 31 can determine whether the scanning line of the input image signal is the scanning line interpolated through the de-interlacing process (operation S501). The scanning line decision unit 31 is provided considering that the artifact suppressing apparatus suppresses the de-interlaced artifacts. Otherwise, in the case of suppressing other artifacts of the image signal, the scanning line decision unit 31 can be removed from the apparatus.

If it can determine that the scanning line of the input image signal is the interpolated scanning line, the differential value calculation unit 33 can calculate the differential value between the present pixel and the adjacent pixel (operation S503). The differential value ΔI calculated by the differential value calculation unit 33 is defined by the difference between the pixel value of the present pixel and the pixel value of the adjacent pixel in the respective direction.

The diffusion amount calculation unit 35 can calculate the amount of diffusion between the present pixel and the adjacent pixel according to the equations 4 and 5 on the basis of the differential value calculated by the differential value calculation unit 33 (operation 505).

The pixel value conversion unit 37 can convert the pixel value of the present pixel of the input image signal on the basis of the amount of diffusion between the present pixel and the adjacent pixel calculated by the diffusion amount calculation unit 35 (operation S505). That is, the pixel value conversion unit 37 can suppress the artifacts of the displayed image signal by converting the pixel of the input image signal into a proper pixel value according to the differential value between the present pixel and the adjacent pixel.

When the pixel value of the present pixel of the input image signal is changed, the counting unit 39 counts the number of processes of converting the present pixel value, from the calculation of the differential value between the present pixel and the adjacent pixel to the conversion of the pixel value of the present pixel (e.g., the number of repetition) (operation S509).

The number of repetitions counted by the counting unit 39 can be compared with a preset value (operation S511). If the number of repetitions is smaller than the preset value, the differential value calculation unit 33 sets the present pixel value to the converted pixel value, and calculates the differential value between the present pixel and the adjacent pixel. This process can be repeated until the number of repititions t becomes larger than the preset value, and if the number of repetitions t becomes larger than the preset value, the converted pixel value is set as a resultant pixel value, and the artifact suppressing process is terminated.

Figure 6:
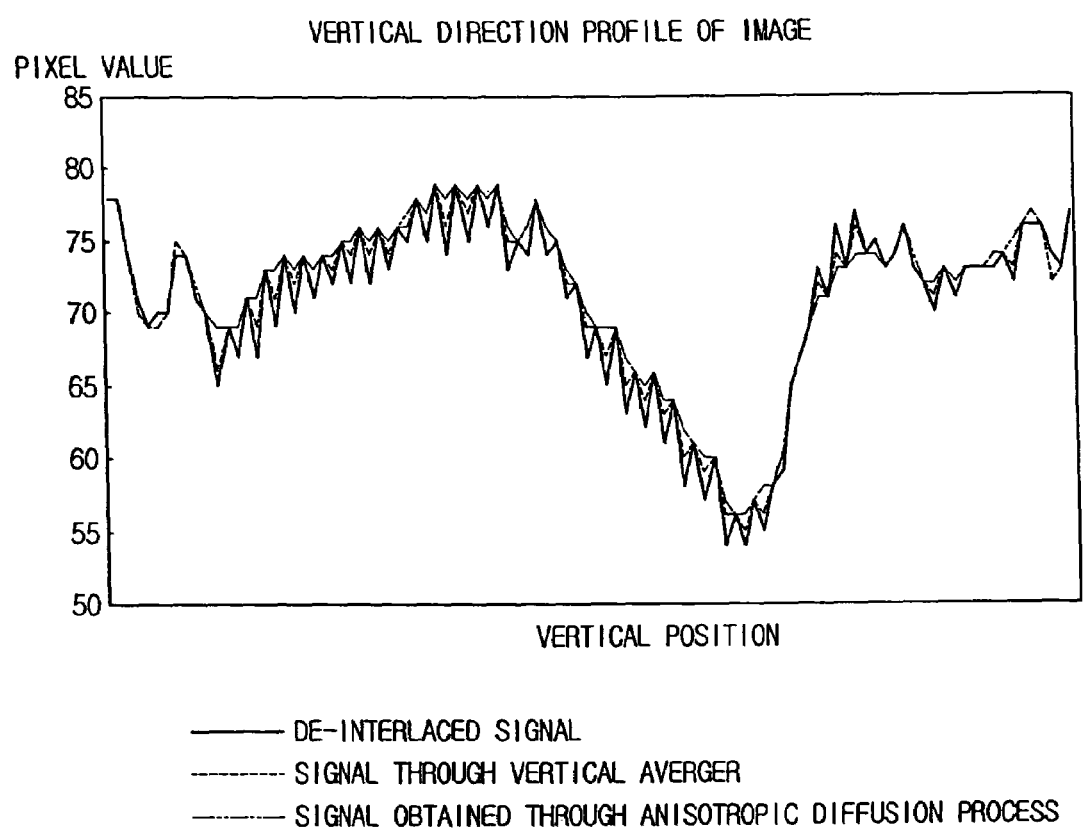
FIG. 6 is a view illustrating an image signal in which artifacts are suppressed by the artifact suppressing apparatus of FIG. 3.

FIG. 6 is a view illustrating an image signal in which artifacts are suppressed by the artifact suppressing apparatus of FIG. 3. Referring to FIG. 6, the horizontal axis represents positions of scanning lines in a vertical direction, and the vertical axis represents pixel values according to the positions of the scanning lines in the vertical direction. The solid line represents an image signal before the sawtooth artifacts are suppressed, and the dotted line represents an image signal after the sawtooth artifacts are suppressed according to the conventional apparatus. The chain double-dashed line represents an image signal after the sawtooth artifacts are suppressed according to the artifact suppressing apparatus according to the present invention.

As shown in FIG. 6, the artifact suppressing apparatus according to an embodiment of the general inventive concept can change the pixel value in consideration of the differential value between the present pixel and the neighboring pixel, and thus it can provide an image signal of a high picture quality without losing or misrecognizing the artifacts of the image signal.

Also, the artifact suppressing apparatus does not filter only in the vertical direction of the image, but can apply the anisotropic diffusion process to all parts of the image signal in consideration of the differential value between the pixels. Accordingly, the artifact suppressing apparatus can provide an image of a high picture quality by suppressing only the artifacts of the image signal.

Although a few embodiments of the inventive concept have been shown and described, it will be appreciated by those skilled in the art that changes may be made in these embodiments without departing from the principles and spirit of the invention, the scope of which is defined in the appended claims and their equivalents.

What is claimed is:

1. An apparatus to suppress artifacts, comprising:
a differential value calculation unit to calculate a differential value between a present pixel value and an adjacent pixel value with respect to an input image signal;
a diffusion amount calculation unit to calculate a diffusion amount between the present pixel value and the adjacent pixel value based on a conduction coefficient that monotonically decreases as a result of an increase in the differential value calculated by the differential value calculation unit;
a pixel value conversion unit to convert the present pixel value of the input image signal into a proper pixel value based on the diffusion; and
a scanning line decision unit deciding whether a first scanning line of the input image signal is an interpolated scanning line from a de-interlacing process;
wherein if the scanning line decision unit decides that the scanning line of the input image signal is the interpolated scanning line, the differential value calculation unit calculates the differential value.

2. The apparatus as claimed in claim 1, further comprising a counting unit to count a number of processes used by the conversion unit to convert the present pixel value with respect to the input image signal,
wherein if the number of processes counted by the counting unit is smaller than a preset value, the differential value calculation unit sets the present pixel value to the proper pixel value and calculates the differential value between the present pixel value and an adjacent pixel value.

3. The apparatus as claimed in claim 2, wherein the differential value calculated by the differential value calculation unit is a difference between the present pixel value and the adjacent pixel value in a respective direction.

4. The apparatus as claimed in claim 3, wherein the diffusion amount calculation unit calculates the diffusion amount by the following equation:

$$D = c \cdot \Delta I,$$

wherein c denotes a conduction coefficient and $c=1/[1+\{|\Delta I|/K\}^2]$, D denotes the diffusion amount, $\Delta I$ denotes a differential value between the present pixel value I and an adjacent pixel value $I_N$, and K denotes a differential value whereby the conduction coefficient becomes 0.5.

5. The apparatus as claimed in claim 4, wherein the pixel value conversion unit converts the present pixel value by the following equation:

$$I_{t+1} = I_t + \lambda \Sigma c \cdot \Delta I,$$

wherein $I_t$ denotes a converted pixel value in the case that the number of repetition is t, and $\lambda$ denotes a constant that determines the effect of the whole diffusion.

6. An apparatus to suppress artifacts, the apparatus comprising:
a diffusion calculation unit to calculate a diffusion amount between a first pixel value and a second pixel value based on a conduction coefficient that monotonically decreases as a result of an increase in the differential value between the first pixel value and the second pixel value;
an artifact suppressor to suppress artifacts by converting the first pixel value into a converted pixel value while compensating for the movement using the diffusion amount; and
a scanning line decision unit deciding whether a first scanning line of the input image signal is an interpolated scanning line from a de-interlacing process;
wherein if the scanning line decision unit decides that the scanning line of the input image signal is the interpolated scanning line, the differential value is calculated.

7. An apparatus as recited in claim 6, wherein the first pixel value is a present pixel value and the second pixel value is an adjacent pixel value.

8. An apparatus as recited in claim 7, wherein the converting is performed using a certain number of repetitions.

9. An apparatus as recited in claim 8, wherein if a current number of repetitions is smaller than a preset amount, then the present pixel value is set to the converted pixel value.

10. An apparatus as recited in claim 9, wherein if the current number of repetitions is greater than a preset amount, then the converting terminates.

11. A method of suppressing artifacts, the method comprising:
calculating a differential value between a present pixel value and an adjacent pixel value with respect to an input image signal;
computing an amount of diffusion between the present pixel value and the adjacent pixel value based on a conduction coefficient that monotonically decreases as a result of an increase in the differential value calculated by the calculating operation;
converting the present pixel value of the input image signal into a proper pixel value based on the diffusion amount between the pixels calculated by the computing operation; and
deciding whether a scanning line of the input image signal is a scanning line interpolated through a de-interlacing process, wherein if it is decided that the scanning line of the input image signal is the interpolated scanning line by the deciding operation, the calculating operation calculates the differential value.

12. The method as claimed in claim 11, further comprising:
counting a number of processes performed in the converting of the present pixel value with respect to the input image signal;
wherein if the differential value computed by the calculating operation is smaller than a preset value, the calculating operation sets the present pixel value to the proper pixel value and calculates the differential value between the present pixel and an adjacent pixel.

13. The method as claimed in claim 12, wherein the differential value calculated by the calculating operation is a difference between the present pixel value and the adjacent pixel value in a respective direction.

14. The method as claimed in claim 13, wherein the computing operation calculates the amount of diffusion by the following equation:

$$D = c \cdot \Delta I,$$

wherein c denotes a conduction coefficient and $c = 1/[1+\{|\Delta I|/K\}^2]$, D denotes an amount of diffusion, $\Delta I$ denotes a differential value between the present pixel value I and the adjacent pixel value $I_n$, and K denotes a differential value whereby the conduction coefficient becomes 0.5.

15. The method as claimed in claim 13, wherein the converting converts the present pixel value to the proper pixel value using the following equation $$I_{t+1} = I_t + \lambda \Sigma c \cdot \Delta I$$

wherein $I_t$ denotes a proper pixel value in the case that the number of repetition is t, and $\lambda$ denotes a constant that determines the effect of the whole diffusion.

16. A method to suppress artifacts, the method comprising:
calculating a diffusion amount between a first pixel value and a second pixel value based on a conduction coefficient that monotonically decreases as a result of an increase in the differential value between the first pixel value and the second pixel value;
suppressing artifacts by converting the present pixel value into a converted pixel value while compensating for the movement using the diffusion amount; and
deciding whether a scanning line of the input image signal is a scanning line interpolated through a de-interlacing process,
wherein if it is decided that the scanning line of the input image signal is the interpolated scanning line by the deciding operation, the differential value is calculated.

17. The method as recited in claim 16, wherein the first pixel value is a present pixel value and the second pixel value is an adjacent pixel value.

18. The method as recited in claim 17 wherein the converting is performed using a number of repetitions.

19. The method as recited in claim 18, wherein if a current number of repetitions is smaller than a preset amount, then the present pixel value is set to the converted pixel value.

20. The method as recited in claim 19, wherein if the current number of repetitions is greater than a preset amount, then the converting terminates.

21. An apparatus to suppress artifacts, comprising:
a differential value calculation unit to calculate a differential value based upon the difference between a first pixel value and a second pixel value of an input image signal;
a diffusion amount calculation unit to determine a conduction coefficient that decreases according to an increase in the differential value calculated by the differential value calculation unit;
a pixel value conversion unit to convert the first pixel value of the input image into an image signal based on the conduction coefficient and the differential value for a predetermined number of repetitions; and
a scanning line detection unit to decide whether a first scanning line of the input image signal is an interpolated scanning line from a de-interlacing process;
wherein if the scanning line detection unit determines that the scanning line of the input image signal is an interpolated scanning line, the differential value calculation unit calculates the differential value.

* * * * *